F. H. FIELD.
VEHICLE WHEEL AND TIRE.
APPLICATION FILED JULY 13, 1914.

1,222,614.

Patented Apr. 17, 1917.

WITNESSES:

INVENTOR
Frank H. Field,
By Attorneys,

UNITED STATES PATENT OFFICE.

FRANK H. FIELD, OF PASSAIC, NEW JERSEY.

VEHICLE WHEEL AND TIRE.

1,222,614.      Specification of Letters Patent.      Patented Apr. 17, 1917.

Application filed July 13, 1914. Serial No. 850,725.

*To all whom it may concern:*

Be it known that I, FRANK H. FIELD, a citizen of the United States, residing in Passaic, in the county of Bergen and State of New Jersey, have invented certain new and useful Improvements in Vehicle Wheels and Tires, of which the following is a specification.

This invention aims to provide an improved wheel and tire adapted for automobiles and other vehicles, and having certain advantages over prior constructions in economy, strength, and freedom from puncturing.

The accompanying drawings illustrate a pneumatic tire embodying the invention.

Figure 1:
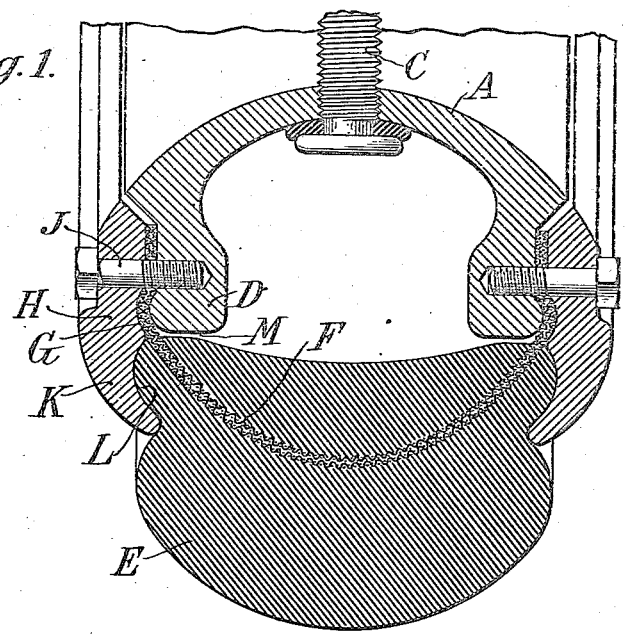

Figure 1 is a transverse section, and

Figure 2:
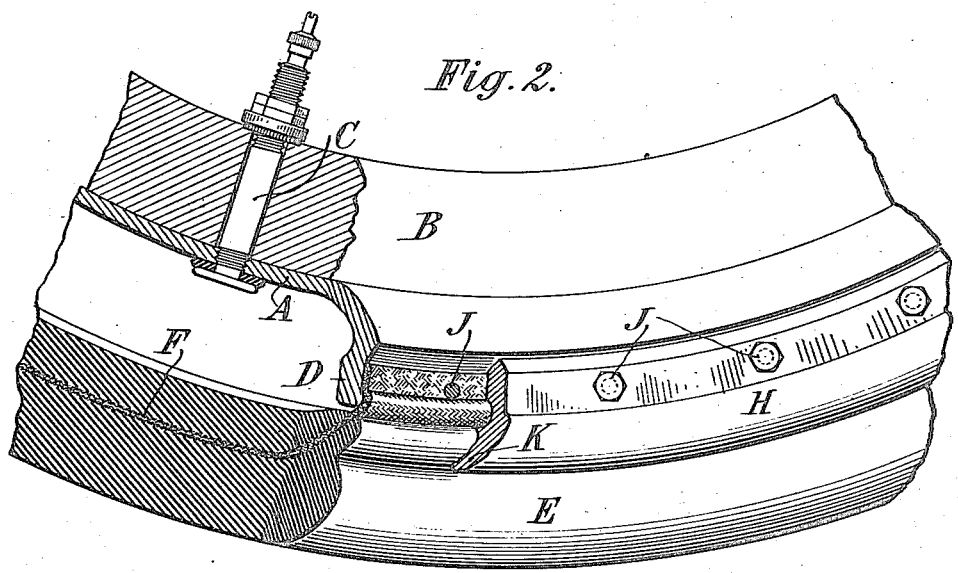

Fig. 2 a side elevation partly in longitudinal section.

Referring to the embodiment of the invention illustrated, the rim A, preferably of aluminum or other light metal, may be fastened by spokes or by any suitable means to the hub, and is made concave so as to form part of the air chamber. It may for example be mounted upon an ordinary wooden rim B (Fig. 2) and provided with the usual pneumatic valve C for introducing the desired air pressure. The opposite sides D of the rim are bridged by a tire E of rubber or equivalent material of considerable thickness so as to extend well beyond the clamping means hereinafter described. The tire E has embedded therein an apron F of canvas or similar fabric impregnated with rubber, extending continuously from one side to the other of the tire, and extending beyond it at the sides to form flexible flaps G which engage the opposite sides of the rim and are fastened thereto. Preferably the flaps G overlie the outer side faces of the rim and are clamped thereon by means of clamping rings H fastened in place by means of bolts J passing through the clamping rings, through holes in the flaps G and into threaded holes drilled into the sides D of the rim.

The clamping rings H extend outward to form supporting rings K which engage the sides of the tire E and support it against sidewise strains. Preferably also these ring portions K are made with inwardly curved outer edges which make a close fit around the flanges L which are formed on the inner portion of the tire E; thus providing means additional to the clamping flaps G for resisting the outward pressure on the tire and limiting the outward movement of the latter.

My improved construction provides a large air chamber with a comparatively small quantity of rubber, the rubber tire E being of approximately the same thickness as the tread portion of the ordinary tire. The fastening by means of the flaps G makes it possible to use flanges L on the tire which are slight compared with the flanges which are depended upon to hold the shoes of tires of the ordinary construction. Besides the yielding of the tire due to the flexibility of the rubber E, there is a certain amount of movement permitted between the opposed edges of the tire and of the rim respectively, the space permitting such movement being indicated at M. The pressure within holds the tire E outward from the rim as far as possible. The inward pressure caused by an obstruction at any point will be taken up first by the yielding of the tire at that point, so as to close the spaces M at opposite sides and thus compress the air. The members K and the flanges L of the tire make a close fit so that the flexible flaps G are prevented from entering the space between the tire flanges L and the rings K. The joint is ordinarily held tight both by the flaps G and by the flanges L. Both these parts may take a portion of the outward strain; while practically the entire side strain is taken by the rings K, which are fully able to withstand it.

My invention therefore provides a tire which is extremely strong without sacrificing any elasticity. Various modifications may be made in detail and in the arrangement of the parts by those skilled in the art, without departure from the invention.

What I claim is:

1. A vehicle wheel including in combination a concave rim, a rubber tire E of considerable thickness bridging the edges of said rim so as to convert the concavity thereof into an air chamber and having thin flexible flaps G, said flaps engaging and being fastened to the opposite sides of the rim with space to permit a slight radial movement between the opposed edges of the tire and of the rim respectively.

2. A vehicle wheel including in combination a concave rim, a rubber tire E of considerable thickness bridging the edges of said rim so as to convert the concavity thereof into an air chamber and extending well beyond the rim, an apron F of fabric embedded in said tire extending continuously from one side thereof to the other and beyond the sides to form thin flexible flaps G, the portion of said tire beyond said apron having side flanges L, and clamping rings H clamping said flaps against the rim with space to permit a slight radial movement between the opposed edges of the tire and of the rim respectively, said clamping rings having inwardly bent outer edges engaging said flanges L to limit such outward movement of the tire.

In witness whereof, I have hereunto signed my name in the presence of two subscribing witnesses.

FRANK H. FIELD.

Witnesses:
D. ANTHONY USINA,
FRED WHITE.